US008088036B2

(12) United States Patent
Fuchs et al.

(10) Patent No.: US 8,088,036 B2
(45) Date of Patent: Jan. 3, 2012

(54) DRIVE CONTROL DEVICE FOR VEHICLE

(75) Inventors: Robert Fuchs, Osaka (JP); Yasuhiko Hasuda, Kashihara (JP)

(73) Assignee: JTEKT Corporation, Osaka (JP)

( * ) Notice: Subject to any disclaimer, the term of this patent is extended or adjusted under 35 U.S.C. 154(b) by 914 days.

(21) Appl. No.: 11/992,761

(22) PCT Filed: Sep. 29, 2006

(86) PCT No.: PCT/JP2006/319418
§ 371 (c)(1),
(2), (4) Date: Mar. 28, 2008

(87) PCT Pub. No.: WO2007/040164
PCT Pub. Date: Apr. 12, 2007

(65) Prior Publication Data
US 2009/0143192 A1 Jun. 4, 2009

(30) Foreign Application Priority Data

Sep. 30, 2005 (JP) ............................... 2005-289085
Mar. 31, 2006 (JP) ............................... 2006-099806
Mar. 31, 2006 (JP) ............................... 2006-099807
Mar. 31, 2006 (JP) ............................... 2006-099808
Aug. 14, 2006 (JP) ............................... 2006-221231
Aug. 14, 2006 (JP) ............................... 2006-221232
Aug. 14, 2006 (JP) ............................... 2006-221233

(51) Int. Cl.
*G06F 19/00* (2011.01)
*G06F 17/00* (2006.01)
*G06F 7/00* (2006.01)
*F16H 37/02* (2006.01)
*F16H 47/06* (2006.01)
*F16H 61/662* (2006.01)
*B60W 10/04* (2006.01)
*B60W 10/10* (2006.01)

(52) U.S. Cl. ............... 477/37; 477/38; 477/45; 477/46; 477/50; 475/904; 475/210; 475/214; 701/54

(58) Field of Classification Search ............ 477/37, 477/38, 44–46, 50; 475/904, 210, 214, 216, 475/217; 701/51, 53, 54–60
See application file for complete search history.

(56) References Cited

U.S. PATENT DOCUMENTS

| 5,521,819 | A | 5/1996 | Greenwood et al. |
| 6,027,425 | A | 2/2000 | Sakaguchi et al. |
| 6,393,349 | B1 | 5/2002 | Yasuoka et al. |
| 6,830,533 | B2 * | 12/2004 | Inoue et al. ............... 477/37 |
| 2001/0041644 | A1 | 11/2001 | Yasuoka et al. |

(Continued)

FOREIGN PATENT DOCUMENTS
GB 1 525 861 9/1978
(Continued)

*Primary Examiner* — Tisha Lewis
(74) *Attorney, Agent, or Firm* — Rabin & Berdo, PC

(57) ABSTRACT

A vehicle drive control device includes a continuously variable transmission mechanism (hereinafter referred to as CVT (6)) of a torque control type capable of continuously varying a transmission gear ratio, and a controller (34) which controls operations of the CVT (6) and an engine (2). The controller (34) includes a first control section (43; 43A) which controls a torque of the CVT (6) based on a target transmission input torque ($T_{TRN,T}$), and a second control section (44) which controls a torque of the engine (2) based on a target engine rotation speed ($\omega_{e,T}$).

20 Claims, 11 Drawing Sheets

U.S. PATENT DOCUMENTS

2002/0019692 A1 2/2002 Yasuoka et al.
2008/0027614 A1* 1/2008 Field et al. .................. 701/60

FOREIGN PATENT DOCUMENTS

| JP | 62-041462 | 2/1987 |
| JP | 7-505699 | 6/1995 |
| JP | 09-217806 | 8/1997 |
| JP | 11-198686 | 7/1999 |
| JP | 2001-071793 | 3/2001 |
| JP | 2001-328466 | 11/2001 |
| JP | 2002-36918 | 2/2002 |
| JP | 2002-286125 | 10/2002 |
| JP | 2004-301185 | 10/2004 |
| JP | 2005-155410 | 6/2005 |
| WO | WO 2004085190 A1 * | 10/2004 |
| WO | WO 2005/015058 A1 | 2/2005 |

* cited by examiner

DRIVE CONTROL DEVICE FOR VEHICLE

TECHNICAL FIELD

The present invention relates to a drive control device for a motor vehicle.

BACKGROUND ART

In a motor vehicle, a driver operates an accelerator pedal to demand engine power. If the diver feels insufficient acceleration, the driver further depresses the accelerator pedal. The rotation speed of vehicle wheels (equivalent to a vehicle speed) is responsive to the operation of the accelerator pedal.

A control system of Patent Document 1 controls both an input to an engine and a counter torque in a CVT (continuously variable transmission) on the basis of a preliminarily stored engine map.

Patent Document 1: Japanese Unexamined Patent Publication No. 7-505699 (1995) (via PCT)

DISCLOSURE OF THE INVENTION

Problems to be Solved by the Invention

The aforementioned CVT is of a torque control type. In the case of the torque control type, a transmission torque is controlled by pushing and pulling a roller by a hydraulic cylinder for pressing the roller against a disk. The transmission torque nonlinearly changes, for example, with respect to a change in the transmission gear ratio of the CVT.

As a result, a plurality of different gains should be selectively employed according to the transmission gear ratio in the control of the hydraulic pressure of the hydraulic cylinder for providing a desired transmission torque.

This complicates computations to be performed in an ECU (Electronic Control Unit), resulting in difficulty in improving power train response. Further, higher costs are required for the tuning and calibration of the control system.

It is therefore an object of the present invention to provide a vehicle drive control device which is less expensive and excellent in responsiveness.

Means for Solving the Problems

According to a preferred embodiment of the present invention to achieve the aforementioned object, a vehicle drive control device comprises a continuously variable transmission mechanism (hereinafter referred to as "CVT") of a torque control type capable of continuously varying a transmission gear ratio, and a controller which controls operations of the CVT and an engine. The controller includes a first control section which controls a torque of the CVT based on a target transmission input torque, and a second control section which controls a torque of the engine based on a target engine rotation speed.

In this embodiment, the torque control of the engine and the control of the target transmission input torque equivalent to a torque load to be applied to the engine are employed in combination, thereby permitting an optimum control operation. That is, a relationship between an input and an output can be linearized in the control performed by the CVT torque control section and the control performed by the engine control section, thereby simplifying the control operation. As a result, power train response can be improved at lower costs in a motor vehicle including the CVT of the torque control type.

DESCRIPTION OF REFERENCE CHARACTERS

1: IVT (infinity variable transmission), 2: engine, 5: IVT input shaft, 6: CVT, 7: planetary gear mechanism, 8: IVT output shaft, 9: CVT input shaft, 10: CVT output shaft, 11,12: input disks, 13,14: output disks, 15,16: rollers, 17: carriage, 18: hydraulic chamber, 19: hydraulic cylinder, 20: first hydraulic chamber, 21: second hydraulic chamber, 27: power circulation mode clutch, 29: direct mode clutch, 31: first pressure control valve, 33: second pressure control valve, 34: controller (controller for controlling operations of CVT and engine), 35: accelerator operation amount sensor, 36: vehicle speed sensor, 37: engine rotation speed sensor, 38: CVT input shaft rotation speed sensor, 39: CVT output shaft rotation speed sensor, 40: pressure sensor, 41: fuel supply amount adjusting mechanism, 42: driver's demand converting section, 43: IVT control section (first control section), 43A: CVT control section (first control section), 44: engine control section (second control section), 46: target vehicle speed computing section, 47: target vehicle speed correcting section, 48: state quantity computing section, 51: target engine rotation speed/target engine torque computing section, 52: target transmission input torque computing section, 54: target transmission input torque correcting section, 55: demanded pressure difference setting section, 59: real transmission input torque computing section, 60: demanded engine torque setting section, $P_D$: demanded pressure difference, $T_{TRN,T}$: target transmission input torque, $T_{TRN,AT}$: corrected target transmission input torque, $T_{TRN,R}$: real transmission input torque (actual transmission input torque), $R_v$: CVT gear ratio, $\omega_i$: CVT input shaft rotation speed, $\omega_o$: CVT output shaft rotation speed, $T_e$: engine torque, $T_{e,D}$: demanded engine torque, $I_e$: engine inertia, $\omega_{e,T}$: target engine rotation speed, $\omega_e$: actual engine rotation speed, k3: control gain, θ: accelerator operation amount, V: vehicle speed

EMBODIMENTS OF THE INVENTION

Preferred embodiments of the present invention will be described with reference to the attached drawings.

Figure 1:
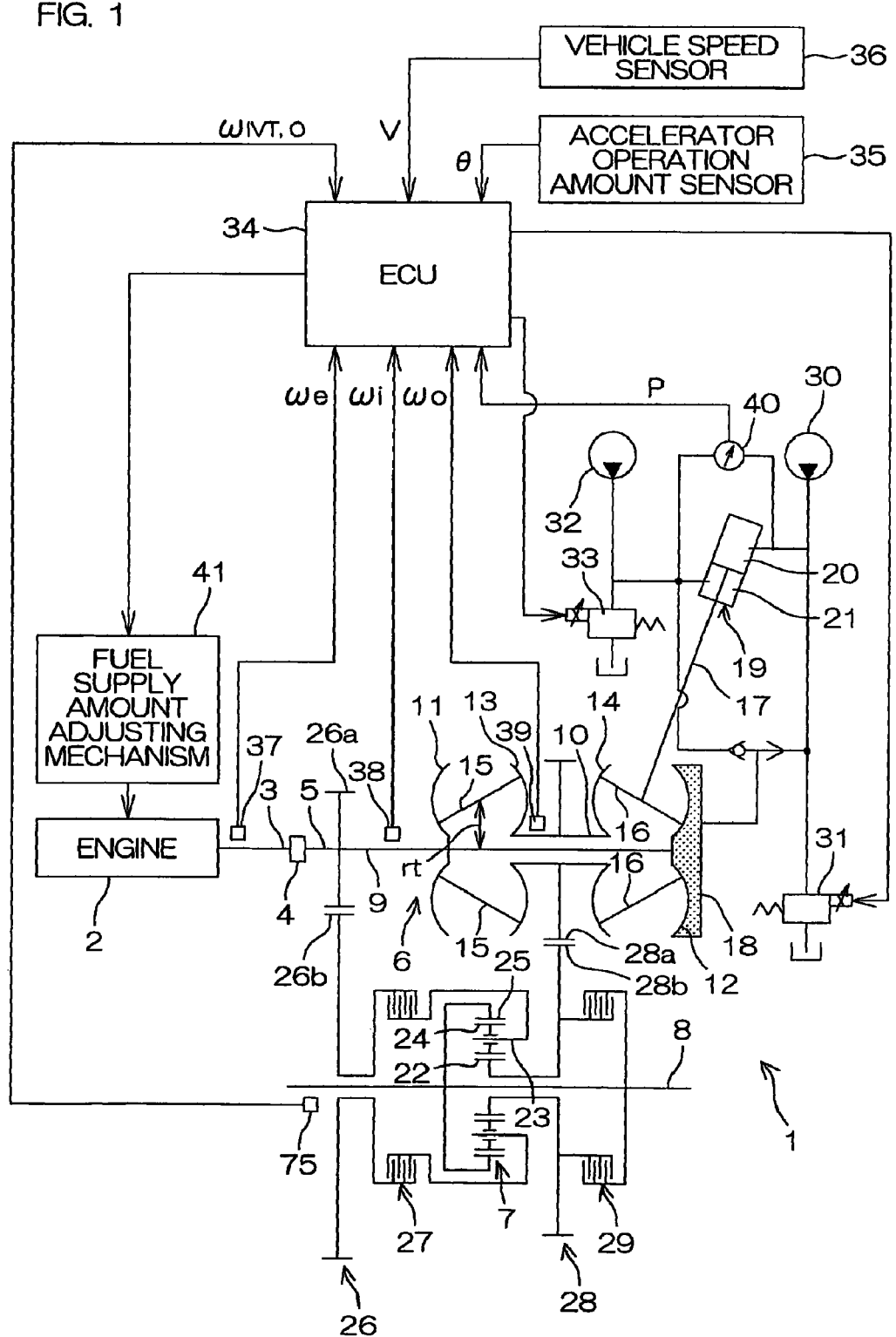
FIG. 1 is a schematic diagram schematically showing the construction of a motor vehicle employing a vehicle drive control device according to one embodiment of the present invention.

FIG. 1 is a schematic diagram schematically showing the construction of a vehicle drive control device according to one embodiment of the present invention. Referring to FIG. 1, an infinitely variable transmission 1 (hereinafter referred to as "IVT 1") includes an IVT input shaft 5 coupled to an output shaft 3 of an engine 2 through a torsion damper 4, a CVT 6 of a full-toroidal continuously variable transmission, a planetary gear mechanism 7, and an IVT output shaft 8 provided parallel to the IVT input shaft 5 and coupled to drive wheels. The CVT 6 is of a so-called torque control type.

In this embodiment, the vehicle drive control device including the IVT 1 will be described, but the present invention is applicable to any vehicle drive control device including a CVT of a torque control type.

The CVT 6 includes a CVT input shaft 9 provided coaxially with the IVT input shaft 5, and a hollow CVT output shaft 10 through which the CVT input shaft 9 is inserted. A pair of input disks 11, 12 are provided corotatably with the CVT input shaft 9. These input disks 11, 12 are positioned back to back, and are each formed with a toroidal race. Further, a pair of output disks 13, 14 each formed with a toroidal race opposed to the toroidal race of the corresponding input disk 11, 12 are provided corotatably with the CVT output shaft 10.

Figure 2:
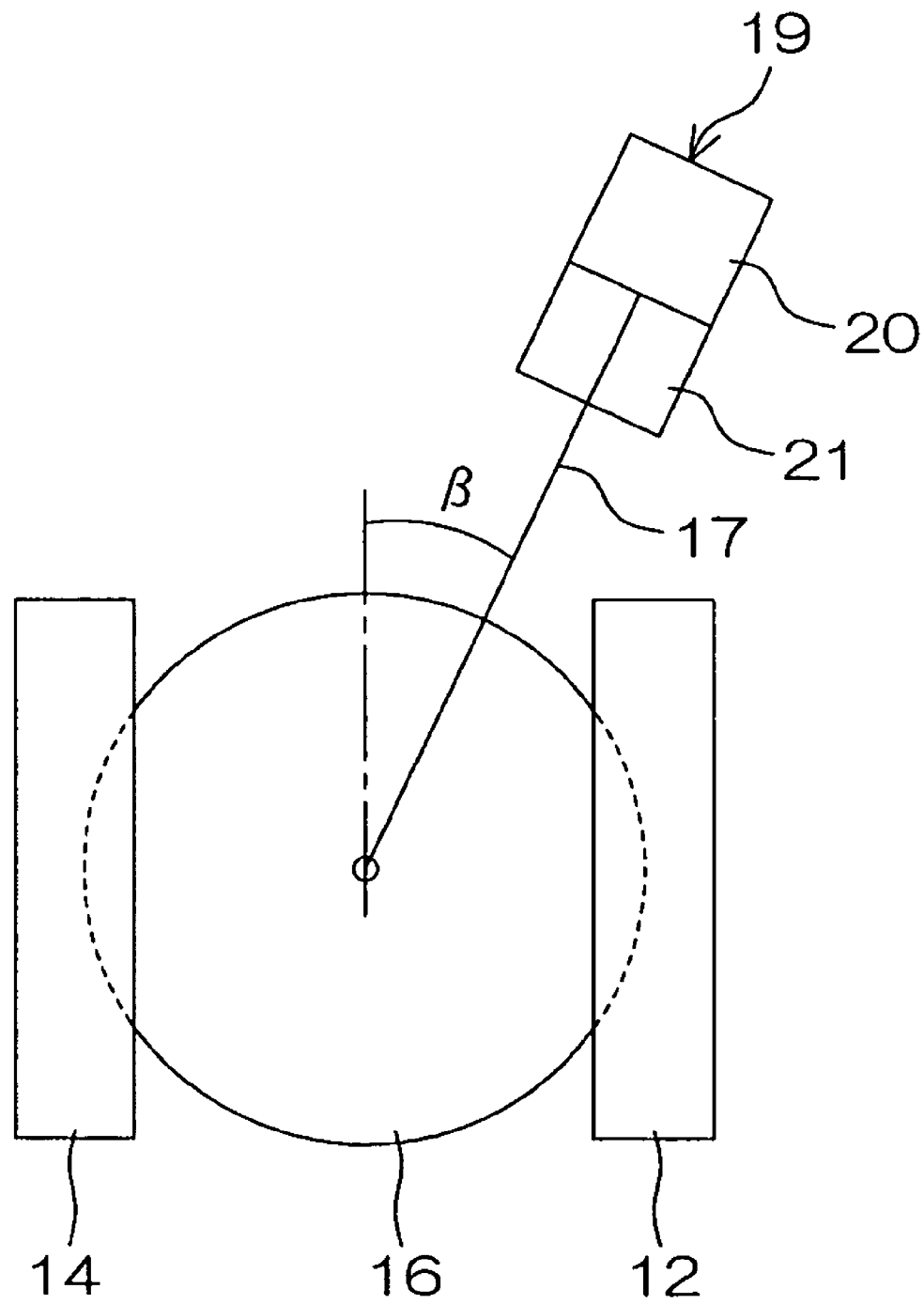
FIG. 2 is a schematic diagram of major portions of a CVT.

Rollers 15, 16 for torque transmission between the disks 11 and 13 and between the disks 12 and 14 are provided between the toroidal races of the input disks 11, 12 and the output disks 13, 14. A torque from the input disk 11 is transmitted to the output disk 13 through the rollers 15, while a torque from the input disk 12 is transmitted to the output disk 14 through the rollers 16. The rollers 15, 16 are each supported by a carriage 17. The axis of the carriage 17 extends perpendicularly to the rotation axis of each of the rollers 16 and forms a predetermined caster angle β with respect to the rotation axis as shown in FIG. 2, though schematically illustrated in FIG. 1. This is true for the rollers 15 and the carriages 17 respectively supporting the rollers 15.

A terminal load is applied to each of the disks 11, 13; 12, 14 by a hydraulic pressure of a hydraulic chamber 18. On the other hand, the rollers 15, 16 each receive a biasing force generated by a pressure difference between first and second hydraulic chambers 20, 21 of a hydraulic cylinder 19 via the carriage 17 to be thereby pressed against the disks 11, 13; 12, 14.

The rollers 15, 16 each supported by the carriage 17 are tilted so that the rotation axes of the rollers 15, 16 each form an oscillation angle about the axis of the carriage 17 to eliminate imbalance between reaction forces occurring in the carriages 17 due to the torque transmission and torques required for driving the output disks 13, 14. This changes the attitudes of the rollers 15, 16 to continuously vary the speed ratios between the disks 11 and 13 and between the disks 12 and 14.

The planetary gear mechanism 7 includes a sun gear 22, a plurality of planetary gears 24 supported by a carrier 23, and a ring gear 25 having inner teeth meshed with the planetary gears 24.

The planetary gear mechanism 7 is disposed between the CVT input shaft 9 and the CVT output shaft 10. More specifically, the ring gear 25 is coupled corotatably with the IVT output shaft 8.

The rotation of the CVT input shaft 9 is transmitted to the carrier 23 through a gear train 26 and a power circulation mode clutch 27 (also referred to as "low clutch") in a coupled state. The gear train 26 includes a gear 26a coupled corotatably with the CVT input shaft 9, and a gear 26b meshed with the gear 26a and rotatably supported by the IVT output shaft 8. The power circulation mode clutch 27 is, for example, a multi-plate clutch which is capable of coupling and decoupling the gear 26b with the carrier 23. The power circulation mode clutch 27 permits a power circulation mode, when being coupled, in which the power transmission is achieved within a transmission gear ratio range including an infinite gear ratio.

The rotation of the CVT output shaft 10 is transmitted to the sun gear 22 through a gear train 28. The gear train 28 includes a gear 28a coupled corotatably with the CVT output shaft 10, and a gear 28b meshed with the gear 28a and coupled corotatably with the sun gear 22. A direct mode clutch 29 (also referred to as "high clutch") capable of coupling and decoupling the gear 28b with the IVT output shaft 8 is disposed between the gear 28b and the IVT output shaft 8. The direct mode clutch 29 permits a direct mode, when being coupled, in which the power transmission is achieved by the CVT 6 alone.

With the direct mode clutch 29 being decoupled and with the power circulation mode clutch 27 being coupled, the power of the engine 2 is transmitted to the carrier 23 through the IVT input shaft 5 and the gear train 26. As a result, a torque is amplified and transmitted by the ring gear 25 of the planetary gear mechanism 7, and outputted to the IVT output shaft 8.

At this time, a reaction force occurring due to a drive load exerted on the ring gear 25 also exerts a torque on the sun gear 22. The torque acting on the sun gear 22 is fed back to the CVT 6 through the gear train 28 and the CVT output shaft 10, and transmitted together with the torque outputted from the engine 2 on the side of the CVT input shaft 9 again to the carrier 23 through the gear train 26 and the power circulation mode clutch 27.

That is, the engine power is outputted to the IVT output shaft 8 and circulated through the CVT 6 and the planetary gear mechanism 7 in the so-called power circulation mode. The power circulation mode is selected when a greater drive torque is required, for example, when the motor vehicle is started, driven at a lower speed, or rapidly accelerated during medium speed traveling.

With the power circulation mode clutch 27 being decoupled and with the direct mode clutch 29 being coupled, on the other hand, the power of the engine 2 is transmitted to the sun gear 22 through the CVT 6, and outputted from the IVT output shaft 8 through the direct mode clutch 29 in the direct mode. The direct mode is selected when a greater drive torque is not required, for example, when the motor vehicle travels at a medium speed or accelerated during high speed traveling.

A hydraulic pressure from a first pump 30 is controlled by a first pressure control valve 31, and applied to the hydraulic chamber 18 for the terminal load and to the first hydraulic chamber 20 of the hydraulic cylinder 19. A hydraulic pressure from a second pump 32 is controlled by a second pressure control valve 33, and applied to the second hydraulic chamber 21 of the hydraulic cylinder 19.

A controller 34 which controls the operations of the IVT 1 and the engine 2 is an electronic control unit (ECU).

The controller 34 is connected to an accelerator operation amount sensor 35 which detects an accelerator operation amount, a vehicle speed sensor 36 which detects a vehicle traveling speed, an engine rotation speed sensor 37, a CVT input shaft rotation speed sensor 38 which detects the rotation speed of the CVT input shaft 9, a CVT output shaft rotation speed sensor 39 which detects the rotation speed of the CVT output shaft 10, a pressure sensor 40 serving as pressure detecting means which detects a pressure difference P between the first hydraulic chamber 20 and the second hydraulic chamber 21 of the hydraulic cylinder 19, and an IVT output shaft rotation speed sensor 75 which detects the rotation speed of the IVT output shaft 8. Signals from these sensors 36 to 40 and 75 are inputted to the controller 34.

To control an engine output, the controller 34 outputs a command signal to a fuel supply amount adjusting mechanism 41 which adjusts the amount of a fuel to be supplied to the engine 2. Further, the controller 34 outputs command signals to the first pressure control valve 31 and the second pressure control valve 33 to control the torque transmission capabilities of the rollers 15, 16. In addition, the controller 34 outputs coupling/decoupling command signals (see FIG. 3) to the power circulation mode clutch 27 and the direct mode clutch 29 for switching between the power circulation mode and the direct mode.

Figure 3:
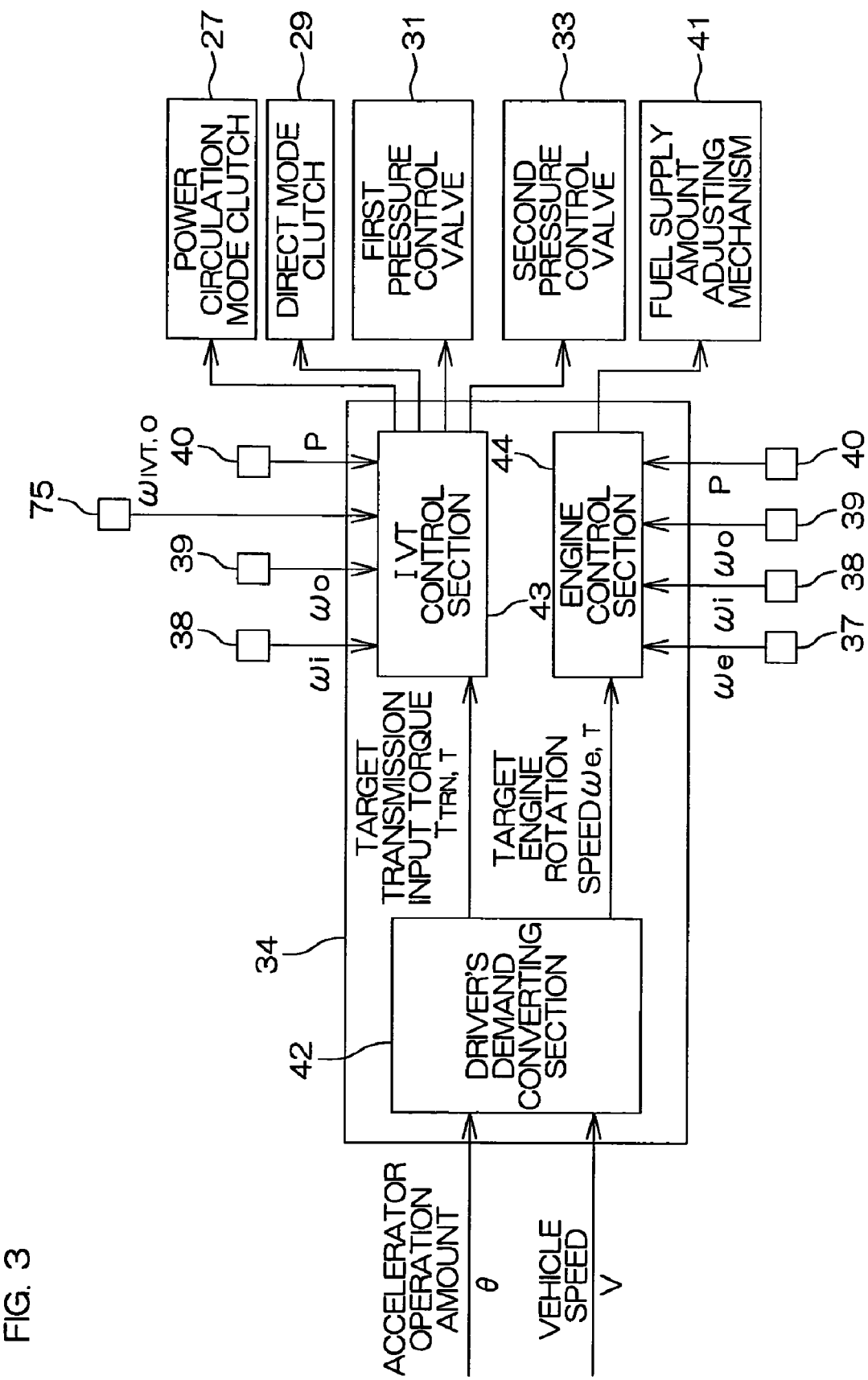
FIG. 3 is a block diagram schematically showing the construction of a controller.

Referring to FIG. 3, the controller 34 includes a plurality of functional sections which are implemented on a software basis by causing a computer to perform predetermined program processes. That is, the controller 34 includes a driver's demand converting section 42, an IVT control section 43 serving as a first control section, and an engine control section 44 serving as a second control section for controlling the engine 2. The driver's demand converting section 42 determines a state quantity for achieving a vehicle driving state demanded by the driver. The IVT control section 43 has the function of controlling the torque of the CVT 6, and the function of switching a mode between the power circulation mode and the direct mode.

With inputs of the accelerator operation amount θ detected by the accelerator operation amount sensor 35 and the vehicle speed V detected by the vehicle speed sensor 36, the driver's demand converting section 42 computes a target engine rotation speed $\omega_{e,T}$ and a target transmission input torque $T_{TRN,T}$ as state quantities which impart the engine 2 with a maximum efficiency on the basis of the accelerator operation amount θ and the vehicle speed V.

With inputs of the target transmission input torque $T_{TRN,T}$ applied from the driver's demand converting section 42, the CVT input shaft rotation speed $\omega_i$ detected by the CVT input shaft rotation speed sensor 38, the CVT output shaft rotation speed $\omega_o$ detected by the CVT output shaft rotation speed sensor 39 and the pressure difference P detected by the pressure sensor 40, the IVT control section 43 outputs command signals, for example, to solenoids of the first and second pressure control valves 31, 33 on the basis of the target transmission input torque $T_{TRN,T}$, the CVT input shaft rotation speed $\omega_i$, the CVT output shaft rotation speed $\omega_O$ and the pressure difference P. With inputs of the CVT input shaft rotation speed $\omega_i$ (corresponding to the IVT input shaft rotation speed) detected by the CVT input shaft rotation speed sensor 38 and the IVT output shaft rotation speed $\omega_{IVT,o}$ detected by the IVT output shaft rotation speed sensor 75, the IVT control section 43 further outputs the coupling/decoupling command signals for the mode switching to the power circulation mode clutch 27 and the direct mode clutch 29 on the basis of the CVT input shaft rotation speed $\omega_i$ and the IVT output shaft rotation speed $\omega_{IVT,o}$.

With inputs of the target engine rotation speed $\omega_{e,T}$ applied from the driver's demand converting section 42, the engine rotation speed $\omega_e$ detected by the engine rotation speed sensor 37, the CVT input shaft rotation speed $\omega_i$ detected by the CVT input shaft rotation speed sensor 38, the CVT output shaft rotation speed $\omega_O$ detected by the CVT output shaft rotation speed sensor 39 and the pressure difference P detected by the pressure sensor 40, the engine control section 44 outputs a valve aperture command signal, for example, to a solenoid of a throttle aperture adjusting valve serving as the fuel supply amount adjusting mechanism 41 on the basis of the target engine rotation speed $\omega_{e,T}$, the engine rotation speed $\omega_e$, the CVT input shaft rotation speed $\omega_i$, the CVT output shaft rotation speed $\omega_0$ and the pressure difference P.

Figure 4:
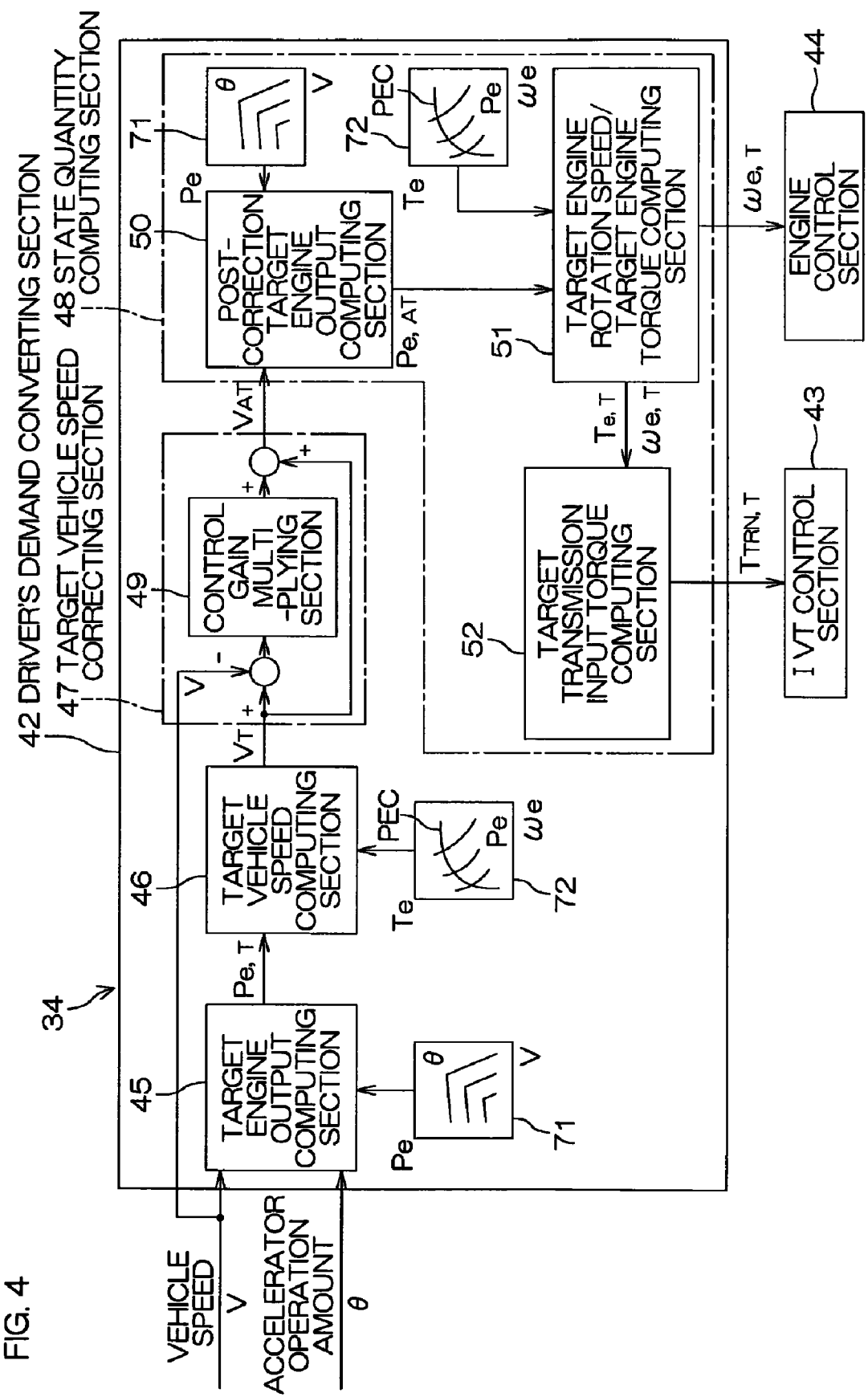
FIG. 4 is a block diagram schematically showing the construction of a driver's demand converting section.

Referring to FIG. 4, the driver's demand converting section 42 includes a target engine output computing section 45, a target vehicle speed computing section 46, a target vehicle speed correcting section 47 and a state quantity computing section 48. With an input of the accelerator operation amount θ detected by the accelerator operation amount sensor 35, the target engine output computing section 45 computes a target engine output $P_{e,T}$ by employing a first engine map 71 preliminarily stored. The first engine map 71 is a map in which engine output levels P for accelerator operation amounts θ and vehicle speed levels V are preliminarily stored.

With an input of the target engine output $P_{e,T}$, the target vehicle speed computing section 46 computes a target vehicle speed $V_T$ by employing a second engine map 72 preliminarily stored. The second engine map 72 is a map in which relationships between the engine rotation speed $\omega_e$ and an engine torque Te which achieve the maximum efficiency for engine output levels Pe are stored as a peak efficiency curve (PEC).

It is herein assumed that $P_V$ is vehicle drive power, $\eta_{PWT}$ is a drive train efficiency, $T_{RL}$ is a vehicle traveling resistance, and $\omega_W$ is a drive wheel rotation speed. Then, the vehicle drive power $P_V$ is equal to the product of the engine output Pe and the drive train efficiency $\eta_{PWT}$, and equal to the product of the vehicle traveling resistance $T_{RL}$ and the drive wheel rotation speed $\omega_W$. That is, an expression $P_V = Pe \times \eta_{PWT} = T_{RL} \times \omega_W$ is established.

Here, the vehicle traveling resistance $T_{RL}$ is expressed as a function $T_{RL}(\omega_W)$ of the drive wheel rotation speed $\omega_W$. That is, an expression $T_{RL} = T_{RL}(\omega_W)$ is established. Therefore, the drive wheel rotation speed $\omega_W$ can be expressed as a function of the engine output Pe. That is, an expression $\omega_W = \omega_W(Pe)$ is established. Therefore, the target drive wheel rotation speed, i.e., the target vehicle speed $V_T$, can be determined by employing the second engine map 72 and the target engine output $P_{e,T}$.

The computed target vehicle speed $V_T$ is outputted to the target vehicle speed correcting section 47.

With an input of the target vehicle speed $V_T$, the target vehicle speed correcting section 47 determines a corrected target vehicle speed $V_{AT}$ by causing a control gain multiplying section 49 to multiply a difference $(V_T-V)$ between the target vehicle speed $V_T$ and the actual vehicle speed V detected by the vehicle speed sensor 36 by a control gain k1 and adding the resulting correction amount $k1 \times (V_T-V)$ to the target vehicle speed $V_T$.

That is, the corrected target vehicle speed $V_{AT}$ is determined based on the following expression (1)

$$V_{AT} = V_T + k1 \times (V_T - V) \tag{1}$$

The corrected target vehicle speed $V_{AT}$ thus obtained is outputted to the state quantity computing section 48. With an input of the corrected target vehicle speed $V_{AT}$, the state quantity computing section 48 computes a target engine rotation speed $\omega_{e,T}$ and a target transmission input torque $T_{TRN,T}$, on the basis of the corrected target vehicle speed $V_{AT}$, which impart the engine 2 with the maximum efficiency.

More specifically, the state quantity computing section 48 includes a post-correction target engine output computing section 50, a target engine rotation speed/target engine torque computing section 51 serving as a target engine performance computing section, and a target transmission input torque computing section 52.

With an input of the corrected target vehicle speed $V_{AT}$, the post-correction target engine output computing section 50 computes a post-correction target engine output $P_{e,AT}$ for the corrected target vehicle speed $V_{AT}$ by employing the aforementioned first engine map 71. That is, a boosted target engine output is provided.

The computed post-correction target engine output $P_{e,AT}$ is outputted to the target engine rotation speed/target engine torque computing section 51. With an input of the post-correction target engine output $P_{e,AT}$, the target engine rotation speed/target engine torque computing section 51 computes the target engine rotation speed $\omega_{e,T}$ and a target engine torque $T_{e,T}$ by employing the aforementioned second engine map 72. At this time, the computation of the target engine rotation speed $\omega_{e,T}$ and the target engine torque $T_{e,T}$ is based on the peak efficiency curve (PEC), thereby making it possible to effectively perform the drive control for improving the mileage without impairing the acceleration performance.

The target engine rotation speed $\omega_{e,T}$ and the target engine torque $T_{e,T}$ computed by the target engine rotation speed/target engine torque computing section 51 are outputted to the target transmission input torque computing section 52, while the computed target engine rotation speed $\omega_{e,T}$ is outputted to the engine control section 44.

With inputs of the target engine rotation speed $\omega_{e,T}$ and the target engine torque $T_{e,T}$, the target transmission input torque computing section 52 computes the target transmission input torque $T_{TRN,T}$ by employing the following expression (2):

$$T_{TRN,T} = T_{e,T} \tag{2}$$

The target transmission input torque $T_{TRN,T}$ is obtained from the expression (2).

Figure 5:
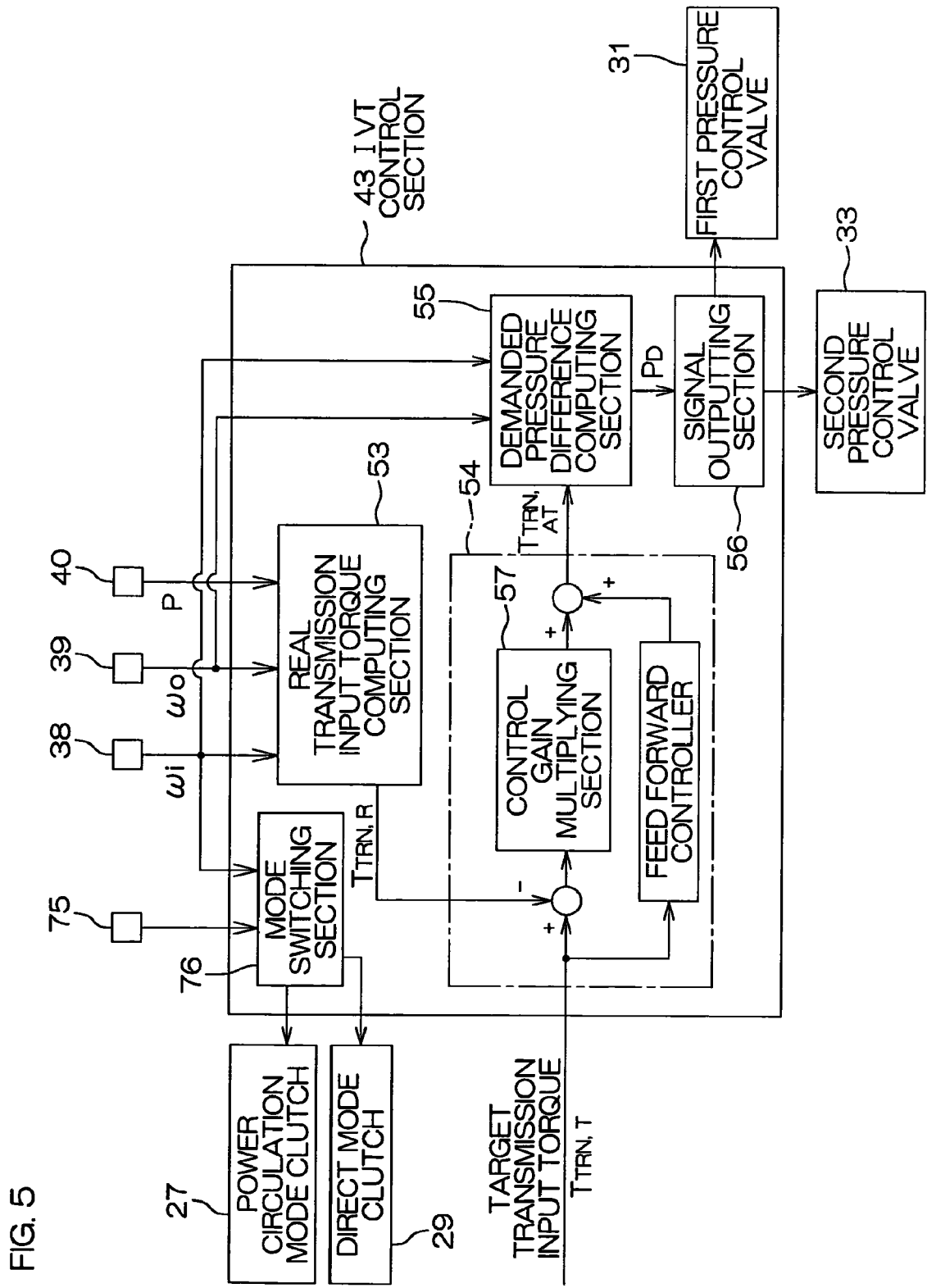
FIG. 5 is a block diagram schematically showing the construction of an IVT control section.

Referring now to FIG. 5, the IVT control section 43 includes a real transmission input torque computing section 53, a target transmission input torque correcting section 54 serving as a CVT torque control section, a demanded pressure difference computing section 55, a signal outputting section 56 and a mode switching section 76.

The mode switching section 76 computes an IVT gear ratio on the basis of the CVT input shaft rotation speed $\omega_i$ (equivalent to the IVT input shaft rotation speed) detected by the CVT input shaft rotation speed sensor 38 and the IVT output shaft rotation speed $\omega_{IVT,o}$ detected by the IVT output shaft rotation speed sensor 75, and outputs the coupling/decoupling command signals to the power circulation mode clutch 27 and the direct mode clutch 29 on the basis of the computed IVT gear ratio for the mode switching.

With inputs of the CVT input shaft rotation speed $\omega_i$ detected by the CVT input shaft rotation speed sensor 38, the CVT output shaft rotation speed $\omega_o$ detected by the CVT output shaft rotation speed sensor 39 and the pressure difference P between the first and second hydraulic chambers 20 and 21 detected by the pressure sensor 40, the real transmission input torque computing section 53 computes a real transmission input torque $T_{TRN,R}$ (for the direct mode) on the basis of the following expression (3):

$$T_{TRN,R} = kr \times [Rv/(Rv-1)] \times P \tag{3}$$

wherein
kr: geometrical constant
Rv: CVT gear ratio ($Rv = \omega_o/\omega_i$)
$\omega_i$: CVT input shaft rotation speed
$\omega_o$: CVT output shaft rotation speed With an input of the real transmission input torque $T_{TRN,R}$ computed by the real transmission input torque computing section 53, the target transmission input torque correcting section 54 computes a corrected target transmission input torque $T_{TRN,AT}$ by causing a control gain multiplying section 57 to multiply a difference ($T_{TRN,T} - T_{TRN,R}$) between the target transmission input torque $T_{TRN,T}$ applied from the target transmission input torque computing section 52 of the driver's demand converting section 42 and the real transmission input torque $T_{TRN,R}$ by a control gain k2, and adding the resulting correction amount $k2 \times (T_{TRN,T} - T_{TRN,R})$ to the target transmission input torque $T_{TRN,T}$.

That is, the corrected target transmission input torque $T_{TRN,AT}$ is determined on the basis of the following expression (4):

$$T_{TRN,AT} = T_{TRN,T} + k2 \times (T_{TRN,T} - T_{TRN,R}) \tag{4}$$

With an input of the corrected target transmission input torque $T_{TRN,AT}$ computed by the target transmission input torque correcting section 54 and with inputs of the CVT input shaft rotation speed $\omega_i$ and the CVT output shaft rotation speed $\omega_o$ for computation of the gear ratio Rv of the CVT 6, the demanded pressure difference computing section 55 computes a demanded pressure difference $P_D$ to be applied between the first and second hydraulic chambers 20 and 21 of the hydraulic cylinder 19 (for the direct mode) by employing the following expression (5) of a linearized inverse function model:

$$P_D = T_{TRN,AT}/[kr \times Rv/(Rv-1)] \tag{5}$$

With an input of the demanded pressure difference $P_D$ computed by the demanded pressure difference computing section 55, the signal outputting section 56 converts the demanded pressure difference $P_D$ into a voltage command signal, and outputs the voltage command signal to the solenoids of the first pressure control valve 31 and the second pressure control valve 33. Thus, desired reaction forces are applied to the rollers 15, 16 to transmit a desired transmission torque to the CVT 6.

Figure 6:
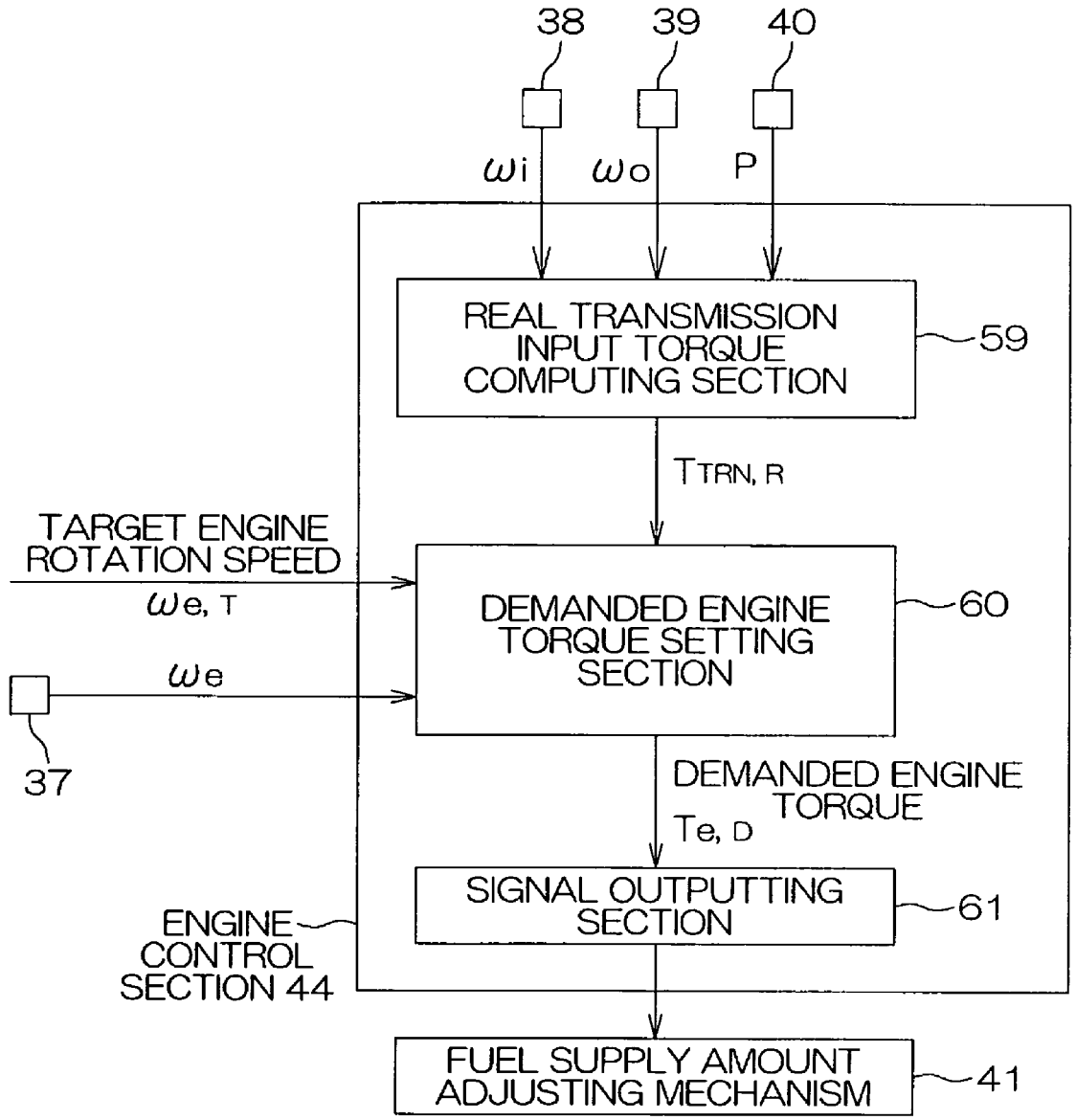
FIG. 6 is a block diagram schematically showing the construction of an engine control section.

Referring next to FIG. 6, the engine control section 44 includes a real transmission input torque computing section 59, a demanded engine torque setting section 60 and a signal outputting section 61.

With inputs of the CVT input shaft rotation speed $\omega_i$ detected by the CVT input shaft rotation speed sensor 38, the CVT output shaft rotation speed $\omega_o$ detected by the CVT output shaft rotation speed sensor 39 and the pressure difference P between the first and second hydraulic chambers 20 and 21 detected by the pressure sensor 40, the real transmission input torque computing section 59 computes the real transmission input torque $T_{TRN,R}$ on the basis of the above expression (3). The computed real transmission input torque $T_{TRN,R}$ is outputted to the demanded engine torque computing {setting} section 60.

With inputs of the real transmission input torque $T_{TRN,R}$, the target engine rotation speed $\omega_{e,T}$ from the target engine rotation speed/target engine torque computing section 51 of the driver's demand converting section 42 and the engine rotation speed $\omega_e$ detected by the engine rotation speed sensor 37, the demanded engine torque setting section 60 sets an engine torque $T_e$ computed from the following expressions (6-1) and (6-2) as a demanded engine torque $T_{e,D}$ ($T_{e,D} = Ie \times k3 \times (\omega_{e,T} - \omega_e) + T_{TRN,R}$).

$$T_e = Ie \times \omega'_{e,AT} + T_{TRN,R} \tag{6-1}$$

$$\omega'_{e,AT} = k3 \times (\omega_{e,T} - \omega_e) \tag{6-2}$$

wherein
Ie: engine inertia
k3: control grain

The first term of the right side of the expression (6-1) is an engine torque component for eliminating a difference ($\omega_{e,T} - \omega_e$) between the actual rotation speed $\omega_e$ of the engine 2 and the target engine rotation speed $\omega_{e,T}$. The second term of the right side is a real transmission input torque $T_{TRN,R}$ which reflects the result of the torque control performed by the IVT control section 43. Here, $\omega'_{e,AT}$ is equivalent to a target engine rotation acceleration.

With an input of the demanded engine torque $T_{e,D}$ set by the demanded engine torque setting section 60, the signal outputting section 61 converts the demanded engine torque $T_{e,D}$ into a voltage command signal, and outputs a voltage command signal, for example, to the solenoid of the throttle valve aperture adjusting electromagnetic valve serving as the fuel supply amount adjusting mechanism 41. This imparts the engine 2 with a desired dynamic characteristic.

In this embodiment, the control of the torque of the engine 2 is combined with the control of the transmission input torque which is a torque load exerted on the engine 2. This permits an optimum control operation. In other words, the optimum control operation is achieved by adding the control of the load torque exerted on the engine through the CVT 6 of the torque control type to the engine control.

More specifically, the relationship between the input and the output is linearized in the control by the IVT control section 43 and the control by the engine control section 44, thereby simplifying the control operation. This reduces the costs and improves the power train response.

That is, where the CVT 6 of the torque control type is employed in a drive system such as the IVT adapted to control the power flow as in this embodiment, the engine inertia is separated from the vehicle inertia. Therefore, the engine torque $T_e$ does not directly influence the rotation speed of the vehicle wheels (substantially equivalent to the vehicle speed V). On the basis of such a premise, the power flow of the system is controlled by combining the torque control of the CVT 6 performed by the IVT control section 43 with the torque control of the engine 2 performed by the engine control section 44, and the above expression (6-1) based on the Newton's second law is employed as a control rule. This makes it possible to determine the demanded engine torque $T_{e,D}$ without consideration of the vehicle inertia and adjust the engine output on the basis of the demanded engine torque $T_{e,D}$.

Since the CVT 6 of the torque control type permits direct control of the input and output torques of the CVT 6, positive power flow from the engine 2 to the vehicle wheels can be constantly maintained. That is, it is virtually ensured that the engine torque $T_e$ is maintained at a higher level than the real transmission input torque $T_{TRN,R}$ ($T_e > T_{TRN,R}$).

Therefore, the power flow from the engine 2 to the drive wheels (positive flow with the engine torque $T_e$ kept at a higher level than the real transmission input torque $T_{TRN,R}$, $T_e > T_{TRN,R}$) can be maintained in a transient drive control operation. That is, a so-called NMP (non-minimum phase) phenomenon can be prevented in which the rotation speed of the vehicle wheels otherwise initially suffers from undershoot in response to depression of an accelerator pedal. As a result, the drivability and the mileage are improved.

Since the IVT control section 43 employs the single control gain k2 for the torque control of the CVT 6 and the engine control section 44 employs the single control gain k3 for the torque control of the engine 2, the control operation is simple and less expensive.

Further, the engine control section 44 serves to separate the engine response from the input torque (load) of the CVT 6 to linearize the engine speed response so that the response of the system linearly or monotonically increases (or decreases). This is advantageous in that the response of the rotation speed $\omega_e$ of the engine 2 and the response of the rotation speed of the vehicle wheels (substantially equivalent to the vehicle speed V) are stabilized irrespective of the control gains k2, k3.

The demanded pressure difference setting section 55 determines the demanded pressure difference $P_D$ on the basis of the above expression (5), i.e., $P_D = T_{TRN,AT} \times (1-Rv)/C$. Therefore, a relationship between the demanded pressure difference $P_D$ and the corrected target transmission input torque $T_{TRN,AT}$ is linearized, and a relationship between the demanded pressure difference $P_D$ and the CVT gear ratio Rv is linearized, thereby simplifying the computation of the demanded pressure difference $P_D$.

More specifically, the demanded pressure difference $P_D$ is increased and reduced according to the transmission gear ratio Rv of the CVT 6, and is increased and reduced proportionally to the target transmission input torque $T_{TRN,AT}$. Therefore, the computation of the demanded pressure difference $P_D$ is very simple.

Further, a driver's demand applied to the motor vehicle through the accelerator pedal is converted into the state quantities, i.e., the target engine rotation speed $\omega_{e,T}$ and the target transmission input torque $T_{TRN,T}$, which impart the engine 2 with the maximum efficiency, by the function of the driver's demand converting section 42. Thus, the engine 2 can be operated at the highest possible efficiency according to the driver's demand without impairing the acceleration performance of the motor vehicle. As a result, the mileage and the drivability are well-balanced.

In the driver's demand converting section 42, the target vehicle speed correcting section 47 corrects the target vehicle speed $V_T$ on the basis of the comparison between the target vehicle speed $V_T$ and the actual vehicle speed V, whereby the engine power is artificially boosted according to the driver's demand. Particularly, the target vehicle speed $V_T$ is corrected by comparing the actual vehicle speed V with the target vehicle speed $V_T$, more specifically, by employing the difference ($V_T - V$) between the target vehicle speed $V_T$ and the actual vehicle speed V, so that the size of a control loop can be reduced.

In the target vehicle speed correcting section 47, the correction amount $k1 \times (V_T - V)$ determined by multiplying the difference ($V_T - V$) between the target vehicle speed $V_T$ and the actual vehicle speed V by the predetermined gain k1 is added to the target vehicle speed $V_T$ to provide the corrected target vehicle speed $V_{AT}$. Since the single gain k1 is thus employed, the tuning of transient characteristics is facilitated in the power control of the engine 2. Further, the control loop is simple and less expensive. In other words, a transmission kick-down function can be provided at lower costs.

In the driver's demand converting section 42, the target vehicle speed $V_T$ is corrected according to the driver's demand, and the target engine output is corrected on the basis of the corrected target vehicle speed $V_{AT}$. Therefore, the engine output is boosted according to the driver's demand. The target level of the engine output to be boosted (the target engine rotation speed $\omega_{e,T}$ and the target engine torque $T_{e,T}$) is computed on the basis of the peak efficiency curve (PEC) for the relationship between the engine rotation speed $\omega_e$ and the engine torque $T_e$. This effectively improves the mileage without impairing the acceleration performance.

Of the above expressions (1) to (6-1), the expressions (1), (2), (4) and (6-1) are applicable to both the direct mode and the power circulation mode, and the expressions (3) and (5) are applicable to the direct mode.

FIGS. 7 to 10 illustrate another embodiment of the present invention. This embodiment is directed to a vehicle drive control device including a CVT of a torque control type which does not constitute an IVT, while the previous embodiment of FIGS. 1 to 6 is directed to the vehicle drive control device having the IVT.

Figure 7:
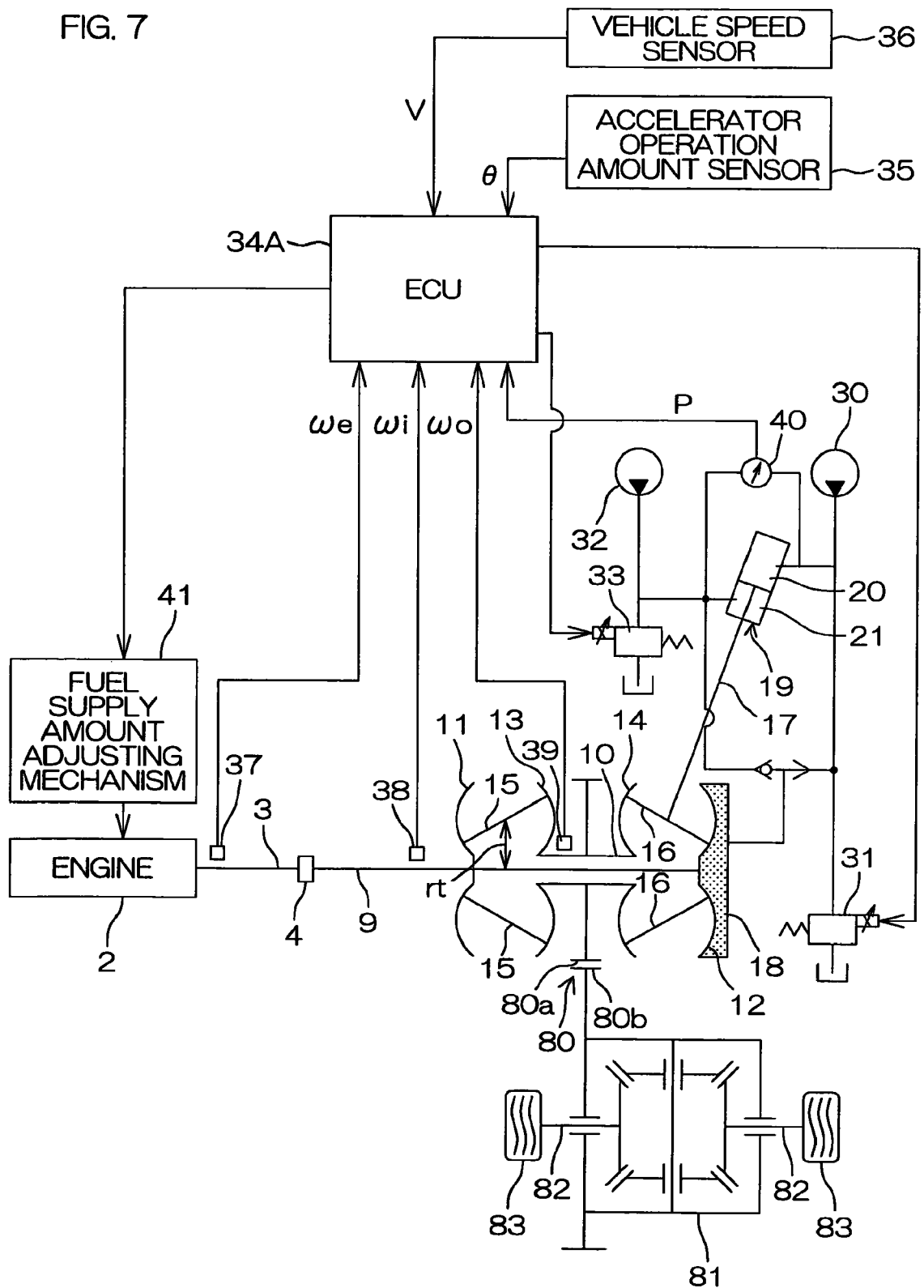
FIG. 7 is a schematic diagram schematically showing the construction of a motor vehicle employing a vehicle drive control device according to another embodiment of the present invention.

Referring to FIG. 7, this embodiment principally differs from the embodiment of FIG. 1 in that the planetary gear mechanism 7, the IVT output shaft 8, the gear trains 26, 28, the power circulation mode clutch 27, the direct mode clutch 29 and the IVT output shaft rotation speed sensor 75 are eliminated. A CVT output shaft 10 is coupled to drive wheels 83 through a gear train 80, a differential device 81 and a drive shaft 82. The gear train 80 includes a gear 80*a* corotatable with the CVT output shaft 10, and a gear 80*b* meshed with the gear 80*a* and corotatable with a case of the differential device 81.

Figure 8:
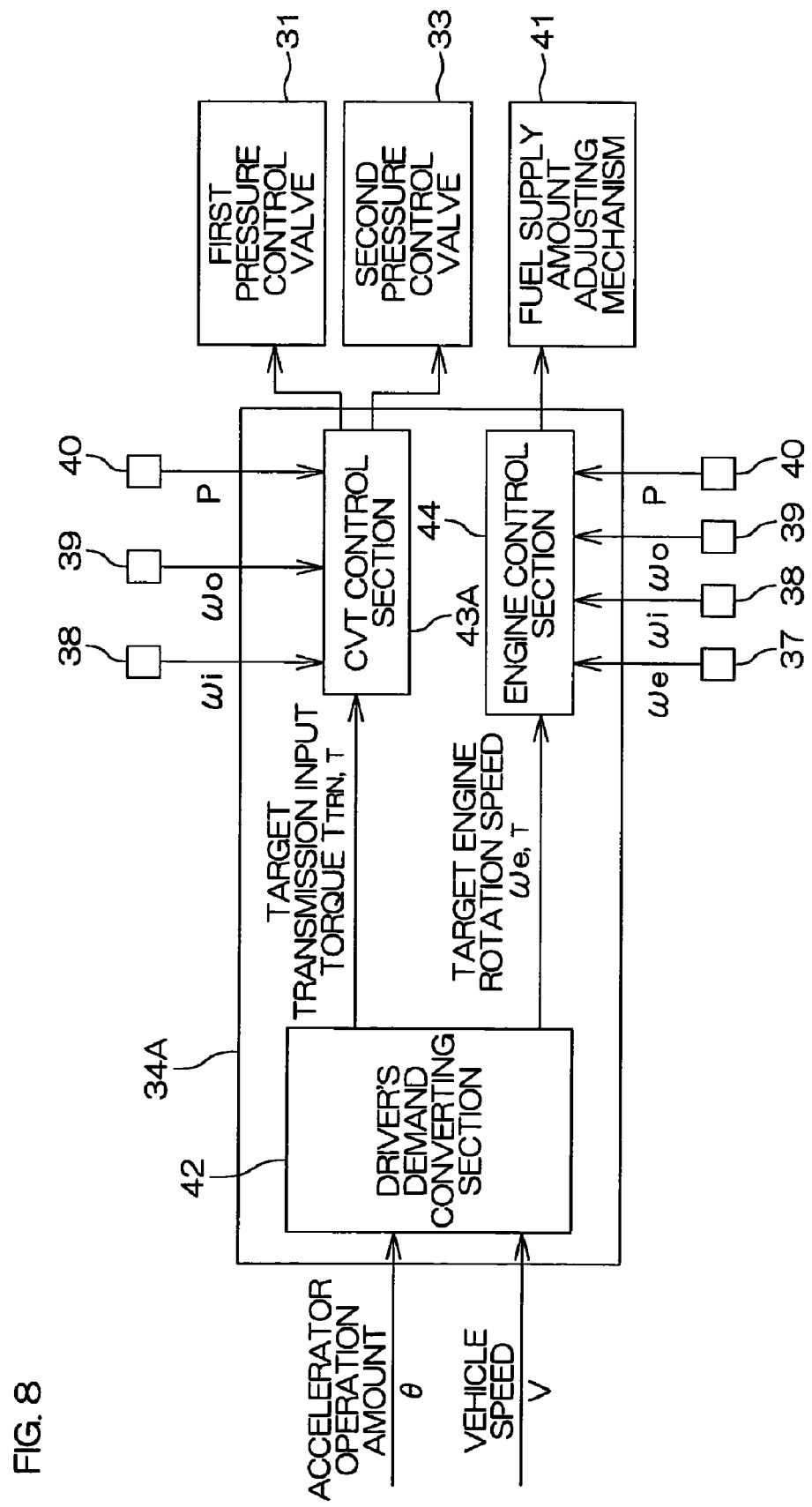
FIG. 8 is a block diagram schematically showing the construction of a controller in the embodiment of FIG. 7.

Referring to FIG. 8, a controller 34A of this embodiment principally differs from the controller 34 of the embodiment of FIG. 3 in that a CVT control section 43A is provided instead of the IVT control section 43. In this embodiment, a target transmission input torque $T_{TRN,T}$ to be applied to the CVT control section 43A from a driver's demand converting section 42 is equivalent to a target CVT input torque.

Figure 9:
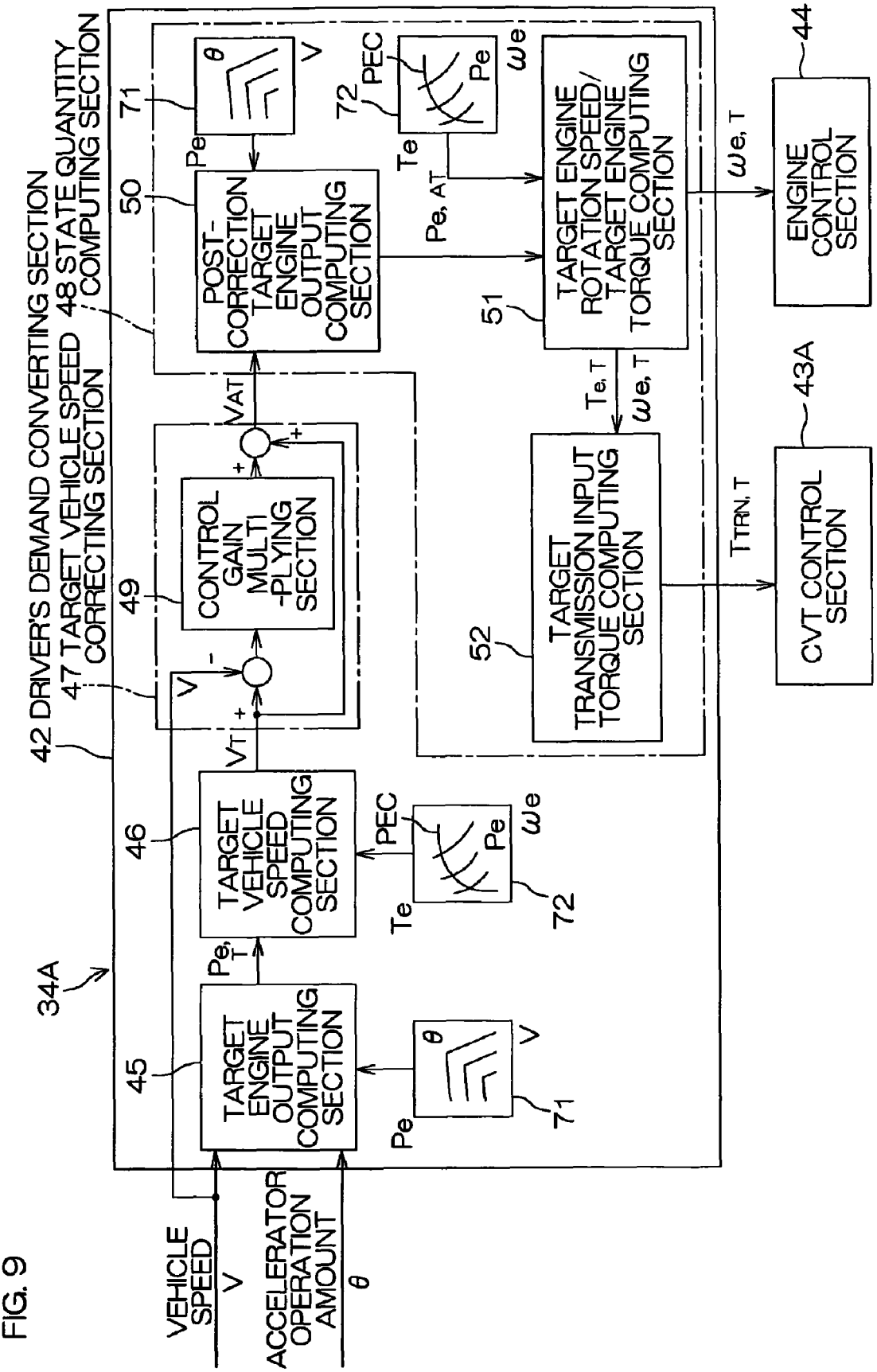
FIG. 9 is a block diagram schematically showing the construction of a driver's demand converting section in the embodiment of FIG. 7.

Referring to FIG. 9, the target transmission input torque $T_{TRN,T}$ is computed by a target transmission input torque computing section 52 of the driver's demand converting section 42 of the controller 34A of this embodiment, and applied to the CVT control section 43A.

Figure 10:
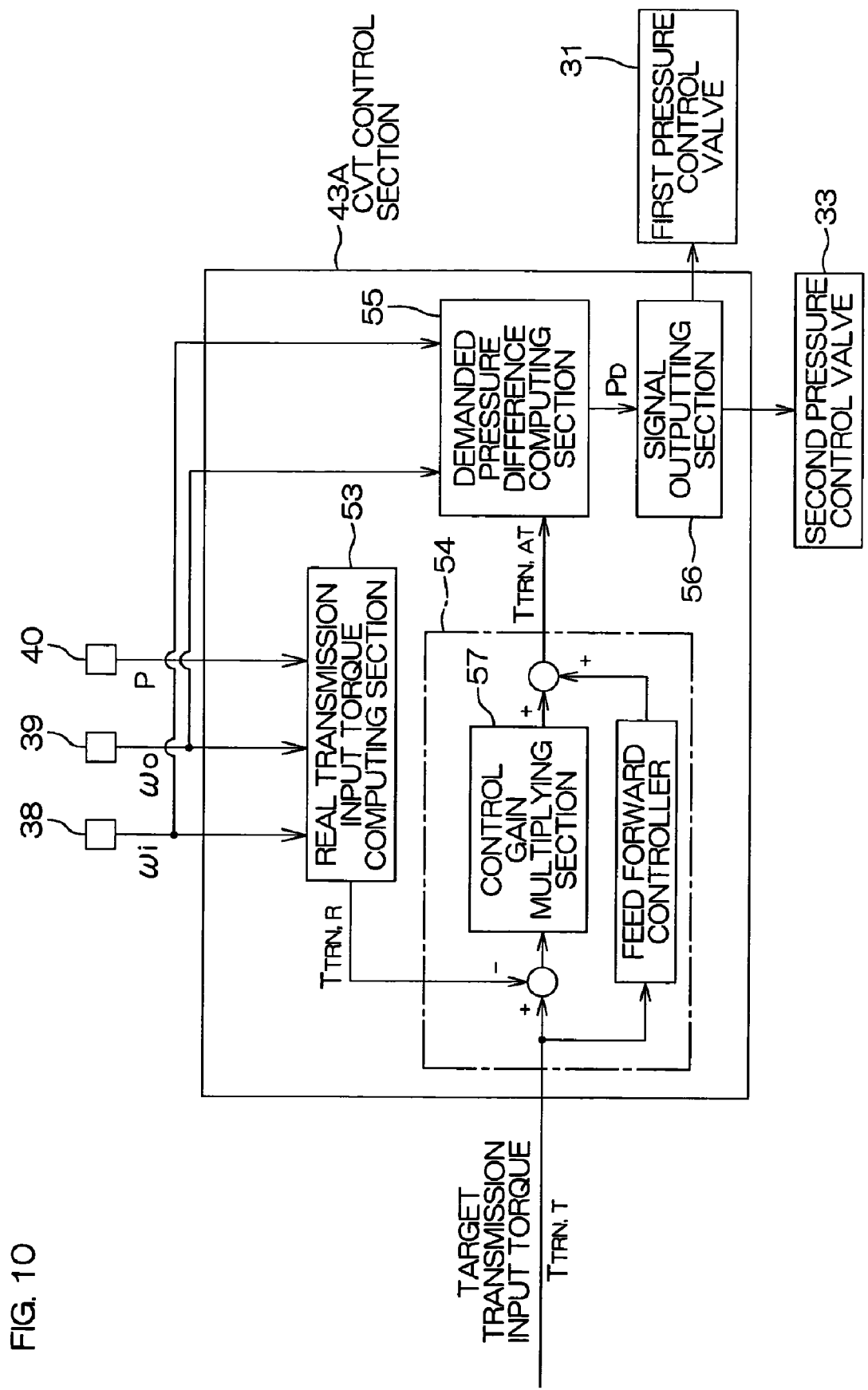
FIG. 10 is a block diagram schematically showing the construction of a CVT in the embodiment of FIG. 7.

Referring to FIG. 10, the CVT control section 43A of this embodiment principally differs from the IVT control section 43 of FIG. 5 in that the mode switching section 76 is eliminated. In this embodiment, a real transmission input torque $T_{TRN,R}$ computed by a real transmission input torque computing section 53 of FIG. 10 is equivalent to the real CVT input torque (actual CVT input torque).

In this embodiment, an engine control section 44 has the same construction as in the embodiment of FIG. 6.

This embodiment provides the same functions and effects as the embodiment of FIGS. 1 to 6, so that the mileage and the drivability are well-balanced.

It should be understood that the present invention be not limited to the embodiments described above. The planetary gear mechanism 7 is simply required to include an element coupled to the CVT input shaft 9, an element coupled to the CVT output shaft 10 and an element coupled to the drive wheels. Further, at least one of the gear trains 26, 28 may be replaced with a chain sprocket mechanism. The type of the CVT is not limited to the full-toroidal type, but may be a half-toroidal type or any other type such as a belt type or a chain type.

EXAMPLES

Figure 11:
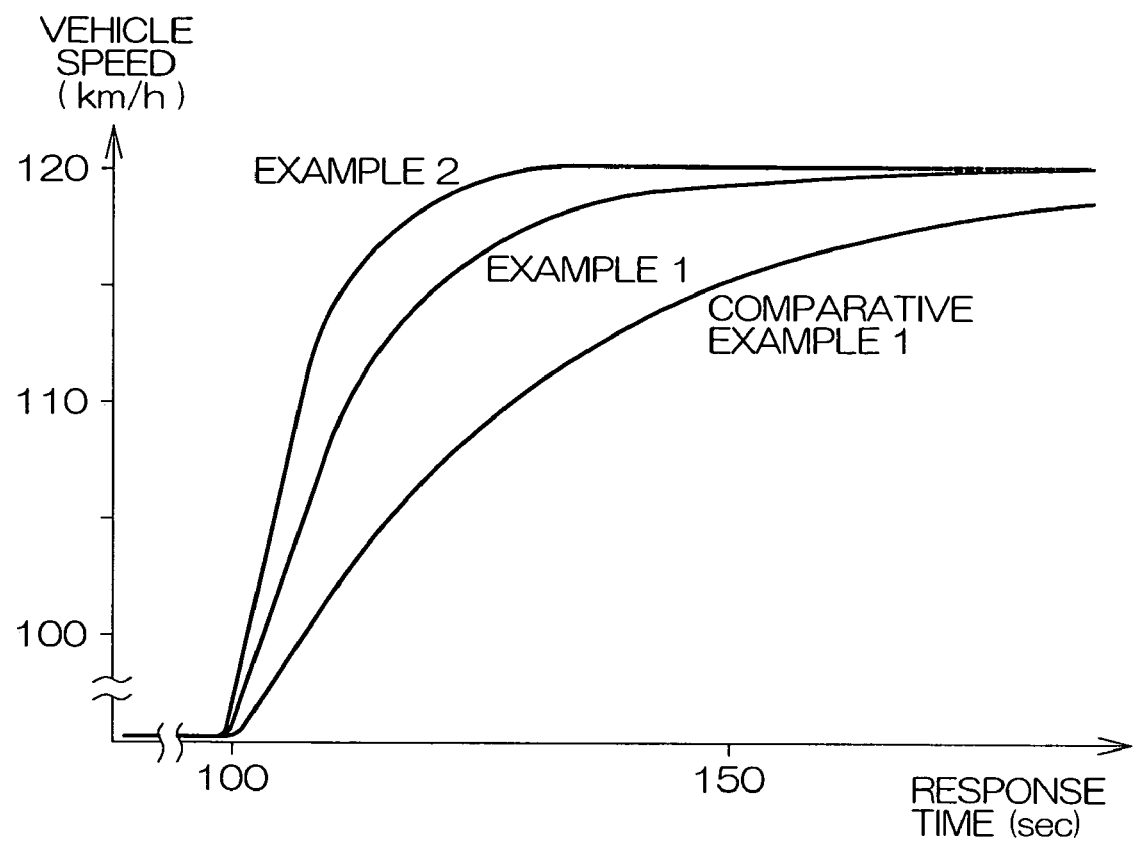
FIG. 11 is a graph showing a relationship between a vehicle speed level and a response time from the operation of an accelerator pedal to the start of a vehicle speed change.

With a control system having the same construction as in FIGS. 1 to 6, the engine output was boosted with the control gain k1 set at a relatively low level in the target vehicle speed correcting section 47 of FIG. 4 in Example 1, and the engine output was boosted with the control gain k1 set at a relatively high level in Example 2. In Comparative Example 1, the target vehicle speed correcting section was eliminated. A simulation was performed to determine a response time from the operation of the accelerator pedal to the start of a vehicle speed change. The results are shown in FIG. 11.

The test results prove that Examples 1 and 2 in which the engine output was boosted by correcting the target vehicle speed according to the driver's demand are much more excellent in responsiveness than Comparative Example 1.

While the present invention has thus been described in greater detail by way of the specific embodiments, those skilled in the art who have understood the foregoing will easily come up with variations, modifications and equivalents of the embodiments. Therefore, the scope of the present invention is defined by the appended claims and their equivalents.

This application corresponds to the following applications filed in the Japanese Patent Office, the disclosure of which is incorporated herein by reference:
Application No. 2005-289085 (filed on Sep. 30, 2005);
Application No. 2006-099806 (filed on Mar. 31, 2006);
Application No. 2006-099807 (filed on Mar. 31, 2006);
Application No. 2006-099808 (filed on Mar. 31, 2006);
Application No. 2006-221231 (filed on Aug. 14, 2006);
Application No. 2006-221232 (filed on Aug. 14, 2006); and
Application No. 2006-221233 (filed on Aug. 14, 2006).

What is claimed is:

1. A vehicle drive control device comprising:
 a CVT mechanism that is capable of continuously varying a transmission gear ratio;
 a controller which controls operations of the CVT and an engine, wherein the controller includes a first control section which controls a torque of the CVT based on a target transmission input torque, and a second control section which controls a torque of the engine based on a target engine rotation speed;
 an input disk and an output disk biased toward each other;
 a roller disposed in a toroidal space defined between the input disk and the output disk for torque transmission between the input disk and the output disk;
 a carriage rotatably supporting the roller; and
 a hydraulic cylinder having first and second hydraulic chambers which generate a pressure difference to apply a force to the roller through the carriage for pushing and pulling the input disk and the output disk,
 wherein the first control section includes a demanded pressure difference setting section which determines a demanded pressure difference between the first and second hydraulic chambers to eliminate a difference between the target transmission input torque and an actual transmission input torque,
 further wherein the first control section further includes a target transmission input torque correcting section which corrects the target transmission input torque to eliminate the difference between the target transmission input torque and the actual transmission input torque,
 further wherein the demanded pressure difference setting section determines the demanded pressure difference based on a corrected transmission input torque applied from the target transmission input torque correcting section.

2. The vehicle drive control device according to claim 1, wherein the demanded pressure difference setting section determines the demanded pressure difference $P_D$ based on the following expression:

$$P_D = T_{TRN,AT}/[kr \times Rv/(Rv-1)]$$

wherein
$T_{TRN,AT}$: corrected target transmission input torque
kr: geometrical constant
$R_v$: CVT gear ratio ($Rv = \omega_o/\omega_i$)
$\omega_i$: CVT input shaft rotation speed
$\omega_o$: CVT output shaft rotation speed.

3. The vehicle drive control device according to claim 1, wherein the demanded pressure difference is increased and reduced according to a CVT gear ratio, and is increased and reduced proportionally to the corrected transmission input torque.

4. A vehicle drive control device comprising:
a CVT mechanism that is capable of continuously varying a transmission gear ratio; and
a controller which controls operations of the CVT and an engine, wherein the controller includes a first control section which controls a torque of the CVT based on a target transmission input torque, and a second control section which controls a torque of the engine based on a target engine rotation speed,
wherein the second control section includes a demanded engine torque setting section which sets an engine torque $T_e$ computed based on the following expression as a demanded engine torque $T_{e,D}$:

$$T_e = Ie \times \omega'_{e,AT} + T_{TRN,R}$$

$$\omega'_{e,AT} = k3 \times (\omega_{e,T} - \omega_e)$$

wherein
Ie: engine inertia
k3: control grain
$\omega_{e,T}$: target engine rotation speed
$\omega_e$: actual engine rotation speed
$T_{TRN,R}$: actual transmission input torque.

5. The vehicle drive control device according to claim 4, wherein a power flow between the engine and a drive wheel is controlled so that the engine torque $T_e$ is greater than an actual transmission input torque $T_{TRN,R}$ acting as an engine load.

6. The vehicle drive control device according to claim 4, wherein the second control section further includes a target engine rotation speed computing section which computes the target engine rotation speed based on a detected accelerator operation amount and a detected vehicle speed.

7. The vehicle drive control device according to claim 4, wherein the CVT includes:
an input disk and an output disk biased toward each other;
a roller disposed in a toroidal space defined between the input disk and the output disk for torque transmission between the input disk and the output disk;
a carriage rotatably supporting the roller; and
a hydraulic cylinder having first and second hydraulic chambers which generate a pressure difference to apply a force to the roller through the carriage for pushing and pulling the input disk and the output disk,
wherein the first control section includes a real transmission input torque computing section which computes an actual transmission input torque, and
wherein the real transmission input torque computing section computes the actual transmission input torque based on detected rotation speeds of the input disk and the output disk or parameters equivalent to the rotation speeds and a detected pressure difference between the first and second hydraulic chambers or a parameter equivalent to the pressure difference.

8. The vehicle drive control device according to claim 1, wherein the controller which controls the operations of the CVT and the engine includes a driver's demand converting section which determines a state quantity which provides a vehicle driving state demanded by a driver.

9. A vehicle drive control device comprising:
a CVT mechanism that is capable of continuously varying a transmission gear ratio; and
a controller which controls operations of the CVT and an engine, wherein the controller includes a first control section which controls a torque of the CVT based on a target transmission input torque, and a second control section which controls a torque of the engine based on a target engine rotation speed,
wherein the controller which controls the operations of the CVT and the engine includes a driver's demand converting section which determines a state quantity which provides a vehicle driving state demanded by a driver, and
wherein the driver's demand converting section computes the target engine rotation speed and the target transmission input torque which impart the engine with a maximum efficiency as the target engine rotation speed and the target transmission input torque based on an accelerator operation amount detected by accelerator operation amount detecting means and a vehicle speed detected by vehicle speed detecting means.

10. The vehicle drive control device according to claim 9, wherein the driver's demand converting section includes:
a target vehicle speed computing section which computes a target vehicle speed based on the detected accelerator operation amount and the detected vehicle speed;
a target vehicle speed correcting section which corrects the target vehicle speed based on a comparison between the target vehicle speed computed by the target vehicle speed computing section and the detected vehicle speed to provide a corrected target vehicle speed; and
a state quantity computing section which computes the target engine rotation speed and the target transmission input torque based on the corrected target vehicle speed.

11. The vehicle drive control device according to claim 10, wherein the target vehicle speed correcting section adds a correction amount obtained by multiplying a difference between the target vehicle speed computed by the target vehicle speed computing section and the detected vehicle speed by a predetermined gain to the target vehicle speed to provide the corrected target vehicle speed.

12. The vehicle drive control device according to claim 10, wherein the state quantity computing section includes:
a target engine performance computing section which computes a target engine rotation speed and a target engine torque which impart the engine with the maximum efficiency based on an engine output associated with the corrected target vehicle speed; and
a target transmission input torque computing section which computes the target transmission input torque based on the target engine rotation speed and the target engine torque computed by the target engine performance computing section.

13. The vehicle drive control device according to claim 12, wherein the target transmission input torque computed by the target transmission input torque computing section is outputted to the first control section.

14. The vehicle drive control device according to claim 12, wherein the target engine rotation speed computed by the target engine performance computing section is outputted to the second control section.

15. The vehicle drive control device according to claim 13, wherein the CVT includes a full-toroidal CVT.

16. A vehicle drive control device comprising:
a CVT mechanism that is capable of continuously varying a transmission gear ratio; and
a controller which controls operations of the CVT and an engine, wherein the controller includes a first control section which controls a torque of the CVT based on a target transmission input torque, and a second control section which controls a torque of the engine based on a target engine rotation speed,
wherein the controller which controls the operations of the CVT and the engine includes a driver's demand converting section which determines a state quantity which provides a vehicle driving state demanded by a driver, wherein the driver's demand converting section determines the target transmission input torque and the target engine rotation speed as the state quantity, wherein the target transmission input torque determined by the driver's demand converting section is outputted to the first control section, wherein the target engine rotation speed determined by the driver's demand converting section is outputted to the second control section.

17. The vehicle drive control device according to claim 1, further comprising an IVT capable of providing a state having an infinite transmission gear ratio,
wherein the IVT includes:
the CVT;
a planetary gear mechanism disposed between an input shaft and an output shaft of the CVT;
a power circulation mode clutch to be coupled when a power circulation mode is implemented to achieve power transmission within a transmission gear ratio range including the infinite transmission gear ratio; and
a direct mode clutch to be coupled when a direct mode is implemented to achieve the power transmission by the CVT alone.

18. The vehicle drive control device according to claim 4, further comprising an IVT capable of providing a state having an infinite transmission gear ratio,
wherein the IVT includes:
the CVT;
a planetary gear mechanism disposed between an input shaft and an output shaft of the CVT;
a power circulation mode clutch to be coupled when a power circulation mode is implemented to achieve power transmission within a transmission gear ratio range including the infinite transmission gear ratio; and
a direct mode clutch to be coupled when a direct mode is implemented to achieve the power transmission by the CVT alone.

19. The vehicle drive control device according to claim 9, further comprising an IVT capable of providing a state having an infinite transmission gear ratio,
wherein the IVT includes:
the CVT;
a planetary gear mechanism disposed between an input shaft and an output shaft of the CVT;
a power circulation mode clutch to be coupled when a power circulation mode is implemented to achieve power transmission within a transmission gear ratio range including the infinite transmission gear ratio; and
a direct mode clutch to be coupled when a direct mode is implemented to achieve the power transmission by the CVT alone.

20. The vehicle drive control device according to claim 16, further comprising an IVT capable of providing a state having an infinite transmission gear ratio,
wherein the IVT includes:
the CVT;
a planetary gear mechanism disposed between an input shaft and an output shaft of the CVT;
a power circulation mode clutch to be coupled when a power circulation mode is implemented to achieve power transmission within a transmission gear ratio range including the infinite transmission gear ratio; and
a direct mode clutch to be coupled when a direct mode is implemented to achieve the power transmission by the CVT alone.

* * * * *